US009660772B2

(12) United States Patent
Goodson et al.

(10) Patent No.: US 9,660,772 B2
(45) Date of Patent: May 23, 2017

(54) DETECTING AND PROCESSING WEAK SIGNALS USING AN ARRAY OF ANTENNAS

(71) Applicant: The Boeing Company, Chicago, IL (US)

(72) Inventors: Anthony P. Goodson, Seattle, WA (US); William Preston Geren, Shoreline, WA (US)

(73) Assignee: The Boeing Company, Chicago, IL (US)

( * ) Notice: Subject to any disclaimer, the term of this patent is extended or adjusted under 35 U.S.C. 154(b) by 191 days.

(21) Appl. No.: 14/571,995

(22) Filed: Dec. 16, 2014

(65) Prior Publication Data
US 2016/0173241 A1 Jun. 16, 2016

(51) Int. Cl.
| H04L 1/20 | (2006.01) |
| H04L 12/26 | (2006.01) |
| H04L 25/05 | (2006.01) |
| H04B 7/0404 | (2017.01) |
| H04B 7/08 | (2006.01) |

(52) U.S. Cl.
CPC ............ *H04L 1/20* (2013.01); *H04B 7/0404* (2013.01); *H04B 7/0842* (2013.01); *H04L 25/05* (2013.01); *H04L 43/04* (2013.01)

(58) Field of Classification Search
CPC ..... H04B 7/0404; H04B 7/0842; H04L 25/05; H04L 1/20; H04L 43/04
See application file for complete search history.

(56) References Cited

U.S. PATENT DOCUMENTS

| 6,091,362 A | * | 7/2000 | Stilp | G01S 5/02 342/457 |
| 2001/0046870 A1 | * | 11/2001 | Stilp | G01S 5/02 455/456.2 |
| 2002/0039904 A1 | * | 4/2002 | Anderson | G01S 5/02 455/456.1 |
| 2003/0190933 A1 | * | 10/2003 | Higbie | H01Q 3/2629 455/562.1 |
| 2004/0017312 A1 | * | 1/2004 | Anderson | G01S 5/02 342/457 |
| 2011/0267219 A1 | | 11/2011 | Kisliansky | |

OTHER PUBLICATIONS

Wikipedia, "Automatic dependent surveillance-broadcast," downloaded from <http://en.wikipedia.org/wiki/Automatic_dependent_surveillance-broadcast> on Dec. 9, 2014, pp. 1-20.

* cited by examiner

*Primary Examiner* — Ajay Cattungal
(74) *Attorney, Agent, or Firm* — Charles L. Moore; Moore & Van Allen PLLC

(57) ABSTRACT

A method for detecting and processing signals may include receiving a weak radio frequency (RF) signal by an array of antennas. The method may also include digitally sampling the weak RF signal from each antenna of the array of antennas and storing the digital samples of the weak RF signal from each antenna. The method may additionally include detecting a presence of the weak RF signal. Detecting the presence of the weak RF signal may include determining a correlation between the weak RF signal received by each of the antennas of the array of antennas using the digital samples of the weak RF signal from each antenna.

20 Claims, 13 Drawing Sheets

$$x_0(k) = s_0(k) + n_0(k) = |s_k|e^{i\phi_0} + |n_{0k}|e^{i\phi_{rand_{0k}}}$$

$$x_1(k) = s_1(k) + n_1(k) = |s_k|e^{i\phi_1} + |n_{1k}|e^{i\phi_{rand_{1k}}}$$

$$\sum_N x_0(k) \cdot x_1^*(k) = \sum_N \left(|s_k|e^{i\phi_0} + |n_{0k}|e^{i\phi_{rand_{0k}}}\right) \cdot \left(|s_k|e^{i\phi_1} + |n_{1k}|e^{i\phi_{rand_{1k}}}\right)^*$$

$$= \sum_N \left(|s_k|^2 e^{i(\phi_0 - \phi_1)} + |n_{0k}|e^{i(\phi_{rand_{0k}} - \phi_{rand_{1k}})} + |s_k \bullet n_{1k}|e^{i(\phi_{rand_{0k}} - \phi_{rand_{1k}})} + |s_k \bullet n_{0k}|e^{i(\phi_{rand_{0k}} - \phi_{rand_{1k}})}\right)$$

$$\approx N|s|^2 e^{i(\phi_0 - \phi_1)} + \sqrt{N}\left(|n|^2 e^{i\phi_{random-A}} + |s|\bullet|n|\bullet\left(e^{i\phi_{random-B}} + e^{i\phi_{random-C}}\right)\right)$$

correlation    magnitude:

$$\sqrt{\left(|s|^2\right)^2 N^2 + \left(\left(|n|^2\right)^2 + 2(|s|\bullet|n|)^2\right)N}$$

$$where \langle n_{0k} \rangle = \langle n_{1k} \rangle = n$$

FIG. 6

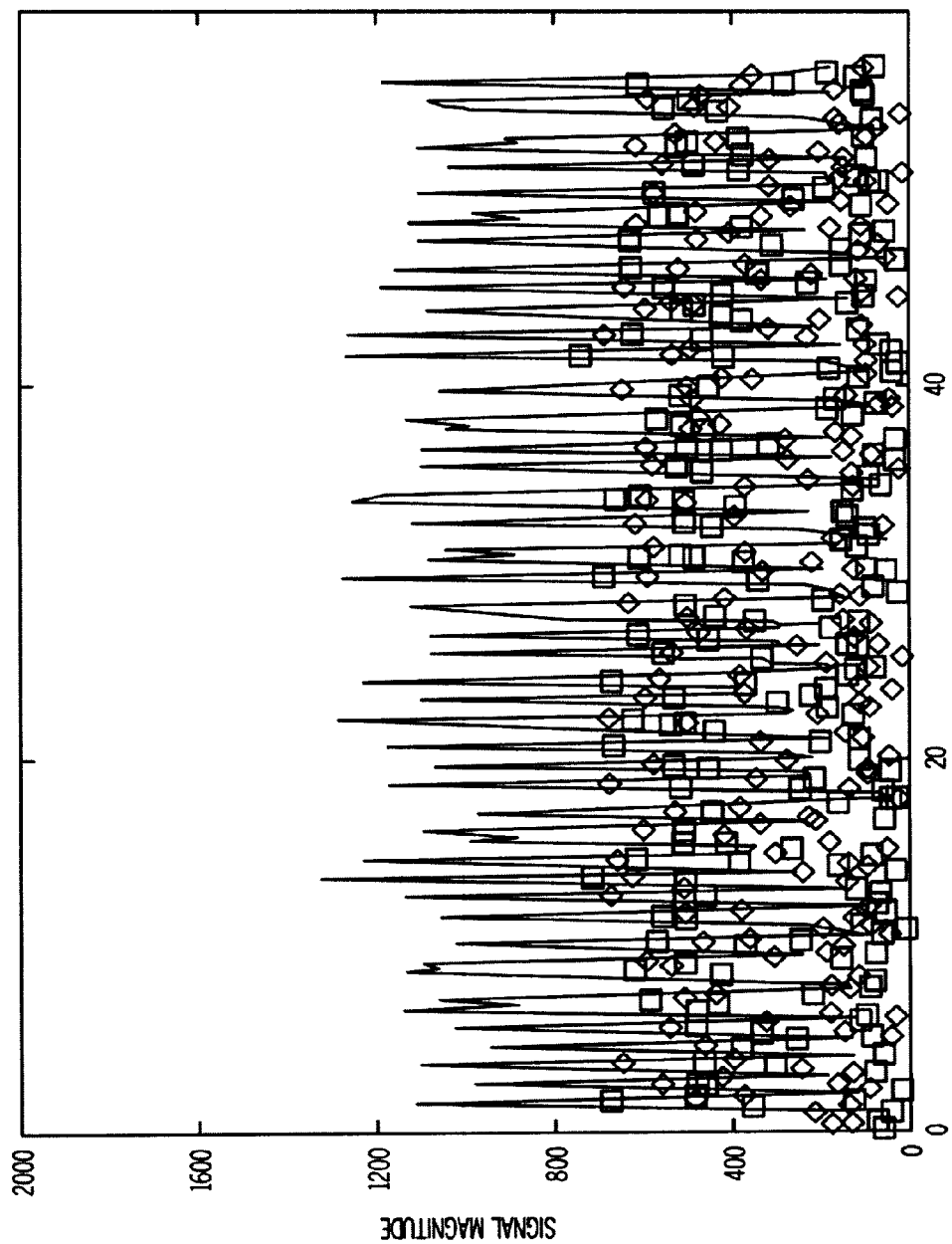

US 9,660,772 B2

DETECTING AND PROCESSING WEAK SIGNALS USING AN ARRAY OF ANTENNAS

FIELD

The present disclosure relates to communications and receiving and processing signals, and more particularly to a method and system for detecting and processing weak signals using an array of antennas.

BACKGROUND

Radio frequency (RF) signals that may be received by an RF receiving device may be difficult to detect for various reasons. The signal may be a low power or low amplitude signal. There may also be noise associated with the desired signals that may make the desired signal difficult to detect. For example, the amplitude or power of the desired signal or information signal may be below the level of the noise. A current system for detecting low power or amplitude signals uses phased array antennas; however, the phased array antennas need to be used for detection with maximum gain achieved along a single angle of arrival. Accordingly, the angle of arrival has to be known or selected a priori. Because current systems employee phase shifting and summing prior to the digitization of the signal, only one angle of arrival will realize the maximum gain. This requires phased array antennas to be scanned either physically or electronically. Another solution may be to digitally sample the signals received by each antenna and have banks of phase summing processors that produce maximum gain signals for a multiplicity of specified angles of arrival. This solution has a significant cost and may be impractical in most applications, particularly where weight and computing capacity need to be economized.

SUMMARY

In accordance with an embodiment, a method for detecting and processing signals may include receiving a weak radio frequency (RF) signal by an array of antennas. The method may also include digitally sampling the weak RF signal from each antenna of the array of antennas and storing the digital samples of the weak RF signal from each antenna. The method may additionally include detecting a presence of the weak RF signal. Detecting the presence of the weak RF signal may include determining a correlation between the weak RF signal received by each of the antennas of the array of antennas using the digital samples of the weak RF signal from each antenna.

In accordance with another embodiment, a method for detecting and processing signals may include receiving a weak radio frequency (RF) signal by an array of antennas. The method may also include digitally sampling the weak RF signal from each antenna of the array of antennas and storing digital samples of the weak RF signal from each antenna. The method may additionally include detecting a presence of the weak RF signal and determining a phase difference of the weak RF signal received by each antenna of the array of antennas. Detecting the presence of the weak RF signal and determining the phase difference of the weak RF signal received by each antenna may include determining a correlation between the weak RF signal received by each of the antennas of the array of antennas using the digital samples of the weak RF signal from each antenna. The method may further include generating a maximum gain signal using the digital samples of the weak RF signal for each antenna and the phase difference of the weak RF signal received by each antenna of the array of antennas in response to detecting the presence of the weak RF signal.

In accordance with a further embodiment, a system for detecting and processing signals may include an array of antennas for receiving a weak RF signal. The system may also include a component configured to digitally sample the weak RF signal from each antenna of the array of antennas and a storage device for storing digital samples of the weak RF signal from each antenna. The system may also include a plurality of channelized correlators. One channelized correlator may be associated with each respective pair of antennas of the array of antennas. Each channelized correlator may be configured to determine a correlation between the weak RF signal received by the associated pair of antennas using the digital samples of the weak RF signal from each antenna. The system ma also include a plurality of channelized summers. One channelized summer may be associated with each respective pair of antennas of the array of antennas for combining the digital samples of signals from the respective pair of antennas to generate a combined signal. The system may also include a comparator to compare a magnitude of a resultant signal from iteratively pair-wise combining the digital samples of signals from each of the antennas of the array of antennas to a preset threshold. A presence of the weak RF signal is detected in response to the magnitude of the resultant signal exceeding the preset threshold.

BRIEF DESCRIPTION OF THE SEVERAL VIEWS OF DRAWINGS

The following detailed description of embodiments refers to the accompanying drawings, which illustrate specific embodiments of the disclosure. Other embodiments having different structures and operations do not depart from the scope of the present disclosure.

FIG. 6 is an illustration of determining or calculating a correlation between an exemplary signal of interest and noise received by each antenna in FIG. 3.

FIGS. 9A-9D are an example of the process or method of FIG. 8 applied to an actual set of data of as 56-bit Automatic Dependent Surveillance-Broadcast (ADS-B) signals in accordance with an embodiment of the present disclosure.

DETAILED DESCRIPTION

Figure 1A:
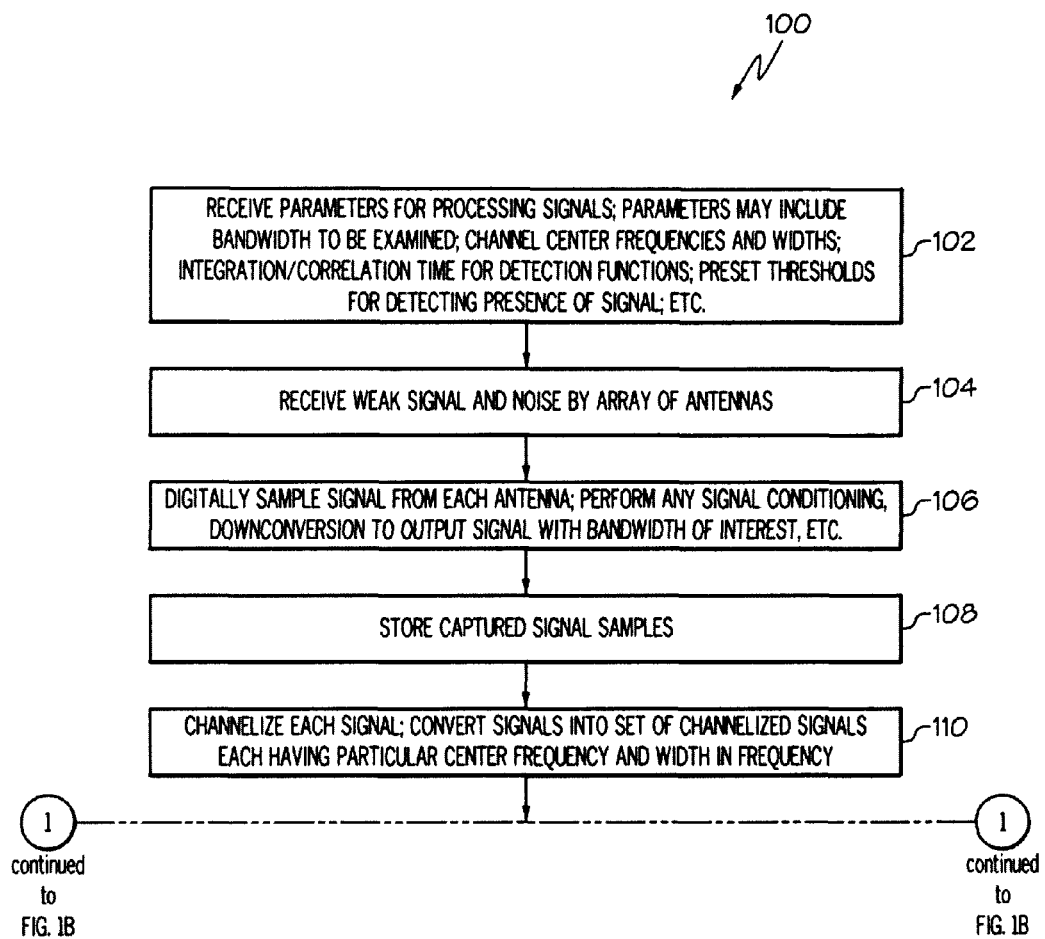
FIGS. 1A and 1B (collectively FIG. 1) are a flow chart of an example of a method for detecting and processing weak signals in accordance with an embodiment of the present disclosure.

The following detailed description of embodiments refers to the accompanying drawings, which illustrate specific embodiments of the disclosure. Other embodiments having different structures and operations do not depart from the scope of the present disclosure. Like reference numerals may refer to the same element or component in the different drawings.

Figure 1B:
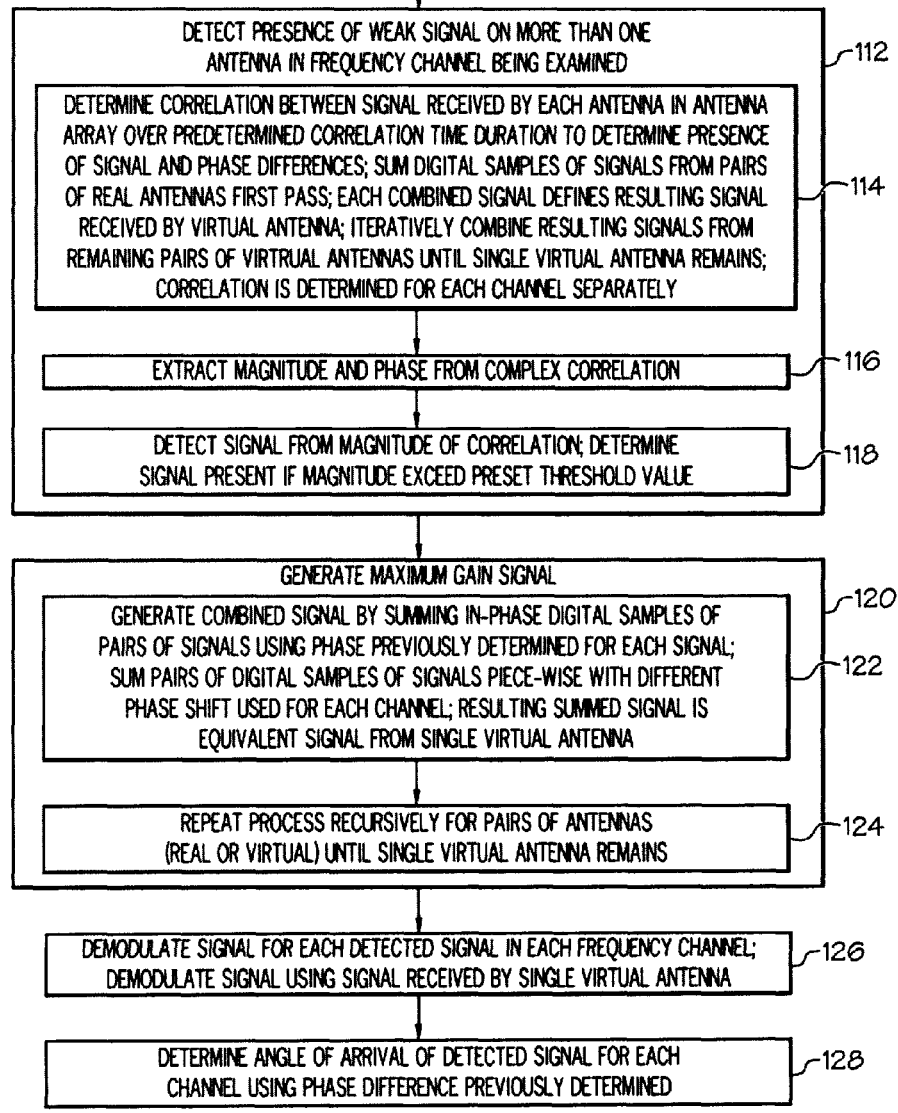

FIGS. 1A and 1B (collectively FIG. 1) are a flow chart of an example of a method 100 for detecting and processing weak radio frequency (RF) signals in accordance with an embodiment of the present disclosure.

In block 102, parameters for detecting and processing weak RF signals may be received. A weak RF signal may be defined as a signal that has a low signal strength relative to noise or noise signals that may be received along with the RF signal, or may be a signal with a signal strength below the signal strength of noise. The parameters may be inputs by a user to a system for detecting and processing RF signals including weak RF signals similar to that described herein. For example, a graphical user interface (GUI) may be presented on a display for entering the parameters. Examples of parameters that may be received from a user may include but is not necessarily limited to a signal bandwidth to be examined, a channel center frequency or frequencies and a channel bandwidth, integration or correlation time for signal detection functions, a preset threshold for detecting a presence of as weak RF signal, and any other parameters that may be helpful in detecting and processing a weak RF signal as described herein.

In block 104, an RF signal may be received by an array of antennas. An example of a system 200 for detecting and processing weak RF signals and that includes an array of antennas 202 for receiving RF signals will be described with reference to FIG. 2. The RF signal may be a weak RF signal similar to that previously described that has a signal strength that is low compared to noise or below a level of noise that may be received with the signal.

In block 106, the signal may be digitally captured or sampled from each antenna of the array of antennas. The signal may be digitally sampled at a sampling rate and bandwidth defined by parameters predefined by the user as described above. Any signal conditioning or down-conversion may be performed to output a signal with a bandwidth of interest.

In block 108, the digital samples of the received signal may be stored. The digital samples may be digitally stored having a bandwidth and sampling rate as previously defined.

In block 110, the digital samples of each signal may be channelized into a set of channelized signals each having a particular center frequency and channel width in frequency. The channel center frequency and channel width may be specified by the user as previously described in block 102.

In block 112, a presence of a weak signal may be detected. The presence of the signal may be detected on more than one antenna of the array of antennas and in a particular frequency channel that is being examined. The functions or operations of blocks 114, 116 and 118 may be included in block 112 for detecting the presence of a weak RF signal.

In block 114, a correlation may be calculated or determined between a signal received by each antenna in the antenna array to determine the presence of the weak signal. The correlation may be calculated for each channel separately. A phase differences between the signal received by each of the antennas may also be determined during the correlation. The correlation may be calculated or determined over a predetermined correlation or integration time duration. The correlation of two signals from each antenna of a pair of antennas may simply be a complex value resulting from the sum of the pairwise complex products of the sampled signals from each antenna in as respective pair of antennas. Accordingly, digital samples of the signal from each antenna of each respective pair of antennas of the antenna array may be combined or summed on a first pass to provide a combined signal for each respective pair of actual antennas. The combined signal of each respective pair of actual antennas of the array may define a resulting signal that may be considered to be received by a virtual antenna. The resulting signals may be iteratively combined in pairs from remaining pairs of virtual antennas after each iteration until a single virtual antenna remains that receives a single resultant signal.

Figure 3:
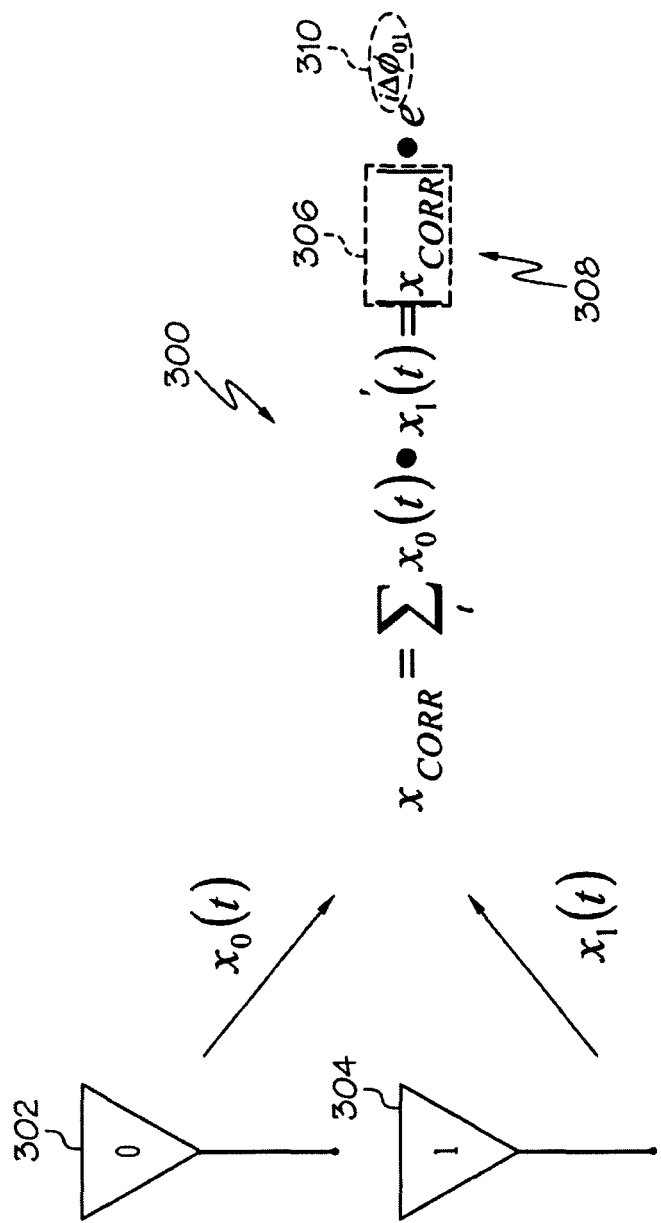
FIG. 3 is an illustration of an example of determining a correlation between two antennas of antenna array in accordance with an embodiment of the present disclosure.

In block 116, a magnitude and phase may be extracted from the single resultant signal from the complex correlation in block 114. The cross correlation magnitude may contain information regarding the presence (or lack thereof) of a signal that is common to both antennas of a pair. The phase of the correlation result may indicate the phase difference of arrival for any detected signal (coherent or incoherent) that is present on both antennas of a pair. Referring also to FIG. 3, FIG. 3 is an illustration of an example of a process 300 for determining a correlation between two antennas of an antenna array in accordance with an embodiment of the present disclosure. Digital samples of signals from a first antenna 302 and a second antenna 304 may be combined similar to that described above. A magnitude 306 of the resultant signal 308 may be used to determine the presence of the RF signal and the phase difference between the two antennas 302 and 304 may be determined from the exponent term 310.

In block 118, the signal may be detected from the magnitude of the correlation. The magnitude may be compared to a preset threshold value and the presence of the signal may be determined if the magnitude exceeds the preset threshold value. The preset threshold value may be entered in block 102 by a user as previously described. The preset threshold value may be expressed as a factor of noise, for example, if the magnitude of the resultant signal exceeds about three times the noise power, then detection of a signal may be declared.

If the presence of a signal is determined in block 112, a maximum gain signal may be generated in block 120. Blocks 122 and 124 may be functions or operations that may be performed as part of block 120 to generate the maximum gain signal.

In block 122, in-phase digital samples of signals from respective pairs of antennas of the array of antennas may be summed to provide as combined signal from each pair of antennas. Each combined signal may be considered to be received by a virtual antenna. A combined signal may be created using the two signals of each respective pair of antennas in the array. Since the relative phase of the two signals is known from block 114, the combined signal is the in-phase sum of the two antenna feeds in each pair. This summing can be done piece-wise in frequency space, with a different phase shift used for each channel. Thus the maximum gain for the antenna array can be realized for each channel. The resulting summed signal is the equivalent of a signal from a single "virtual" antenna, which can be used in the next iteration of this process.

In block 124, the in-phase combined signals may be recursively summed from respective pairs of virtual antennas until a single resultant combined signal is provided. The single resultant combined signal may be the maximum gain signal. This result, which will contain the suite of channelized signals, will consist of a signal that uses maximum antenna array gain in the direction of reception for each channel. An example of a process or method for recursively summing antenna pair (real virtual) to generate a maximum gain signal will be described with reference to FIG. 8.

Blocks 122 and 124 are associated with a recursive process used to reconstruct as best estimate of the signal possible using measurements from all antennas of the antenna array. The resulting signal strength may be equal to a result obtained with a standard legacy phased-array antenna approach (when one signal dominates the emission in the frequency channel in question), however method 100 does not require a-prior commitment to a specific line of sight as in the standard legacy phased-array approach. Legacy phased array antenna systems require an a-priori selection of a "beam position" prior to the detection process. Otherwise, potential transmitters outside of the array "beam" will not be detected. Further, method 100 will produce the maximum gain signal for each channel, even if the sources in the different channels are transmitting from very different relative angles.

In block 126, the signal for each detected signal may be demodulated or decoded in each frequency channel. The single resultant signal or maximum gain signal, such as signal 802 in FIG. 8 may be used for the demodulation or decoding.

In block 128, an angle of arrival of the detected signal may be determined for each channel using the phase difference information determined in block 114.

Figure 2:
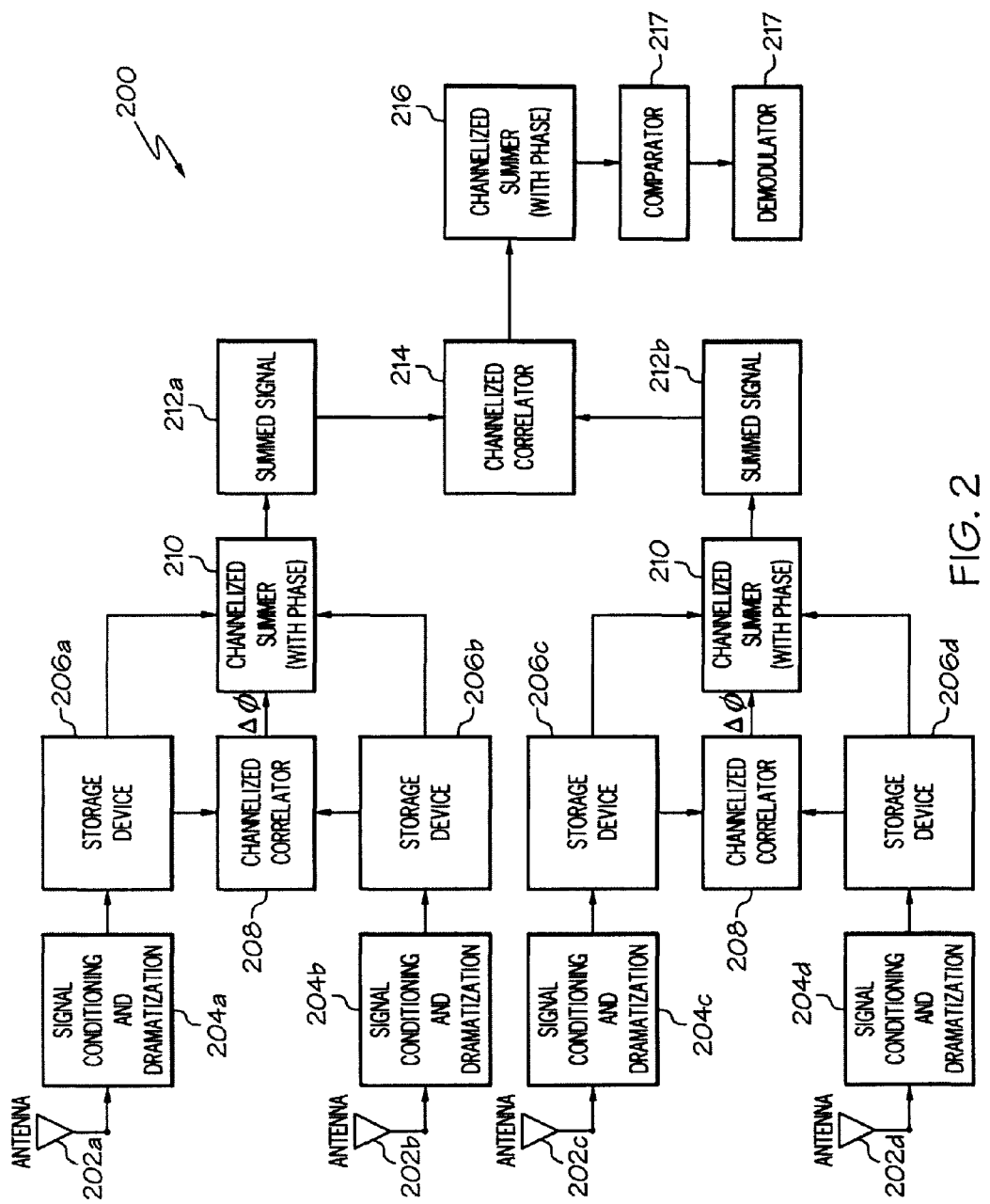
FIG. 2 is a block schematic diagram of a system for detecting and processing weak signals using an array of antennas in accordance with an embodiment.

FIG. 2 is a block schematic diagram of a system 200 for detecting and processing weak signals using an array of antennas 202a-202d in accordance with an embodiment. A signal conditioning and digitization component 204a-204d may digitally sample the signal from each antenna 202a-202d. The digitally sampled signal may be stored in as storage device 206a-206d.

A channelized correlator 208 may execute a channelized correlation algorithm on the data or sampled signal from two antennas 202a-202b and 202c-202d of each pair of antennas. For each channel of interest, the channel correlation algorithm may detect the presence of any signal, and will produce the phase difference between the signals of each antenna pair 202a-202b and 202c-202d. The detectability of the signal using this approach is dependent on the strength of the signal, its duration, and the length (time) of the digitally stored signal. The longer the signal storage time (or correlation time), the more detectible the signal will be until the signal duration is exceeded, or until the phase has drifted considerably.

A channelized summer 210 sums the signal from each antenna pair using the phase difference in each channel from the channelized correlator 208 to produce a summed signal 212a and 212b from each pair of antennas 202a-202b and 202c and 202d.

Another channelized correlator 214 may execute a channel correlation algorithm on the summed signals 212a and 212b. The summed signals 212a and 212b may also be summed in another channelized summer 216 using the phase difference from the channelized correlator 214 to produce a single resultant signal similar to that previously described. The system 200 may also include a comparator 217 to compare as magnitude of the single resultant signal from iteratively pair-wise combining the digital samples of signals from each of the antennas 202a-202d of the array of antennas to a preset threshold. The single resultant signal may be decoded or demodulated by a demodulator 218 to extract whatever information may be on the reconstructed signal.

As previously discussed, FIG. 3 is an illustration of an example of a process 300 for determining a correlation between two antennas of an antenna array in accordance with an embodiment of the present disclosure. The channelized correlator 208 in FIG. 2 may perform the process 300. The signals, actually a signal plus noise received from each antenna are denoted by x0 and x1 and are correlated per equation 1 below and shown in FIG. 3:

$$x_{corr} = \Sigma_t x_0(t) \cdot x'_1(t) = |x_{corr}| \cdot e^{i\Delta\phi_{01}}$$ Equation 1

The result of the correlation, which is summed over the user-selected correlation time T, will be a complex number. This complex correlation result can be expressed as a magnitude 306 and a phase 310 as enclosed in the broken lines in FIG. 3 and per the right hand side of Equation 1. The phase extracted from the result is the phase difference associated with the different times of arrival across the antenna array. The magnitude element of the calculation in FIG. 3 and Equation 1 is used for detecting a weak signal as previously described, and the phase difference is used to support the in-phase summing of the antennas to produce virtual antenna pairs similar to that described with reference to FIG. 8.

Figure 4:
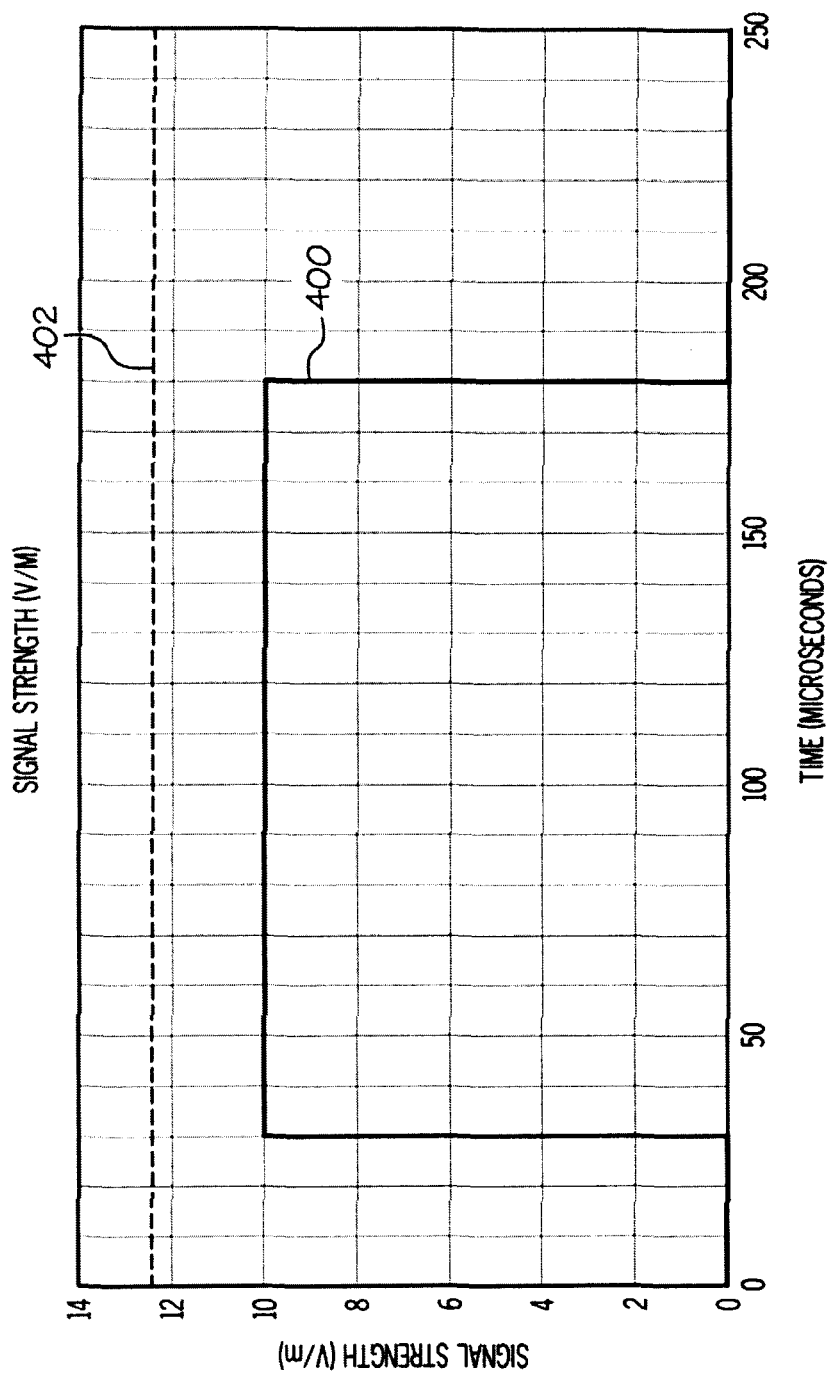
FIG. 4 is as graph depicting signal strengths of an exemplary signal of interest and noise received by each antenna in FIG. 3.

FIG. 4 is a graph depicting signal strengths of an exemplary signal 400 of interest and noise 402 received by each antenna of a pair of antennas, such as antennas 302 and 304 in FIG. 3. FIG. 4 illustrates signal strength typically measured in units of volts/meter, or, for simple antenna arrangements, volts. In the example of FIG. 4, the signal 400 is weaker than the noise 402. The signal 400 shown is about 120 microseconds long, which is representative of extended squitter messages in the 2020 mandated Federal Aviation Administration (FAA) Air Traffic Control Radio Beacon (ATCRB) Automatic Dependent Surveillance-B (ADS-B) format.

Figure 5:
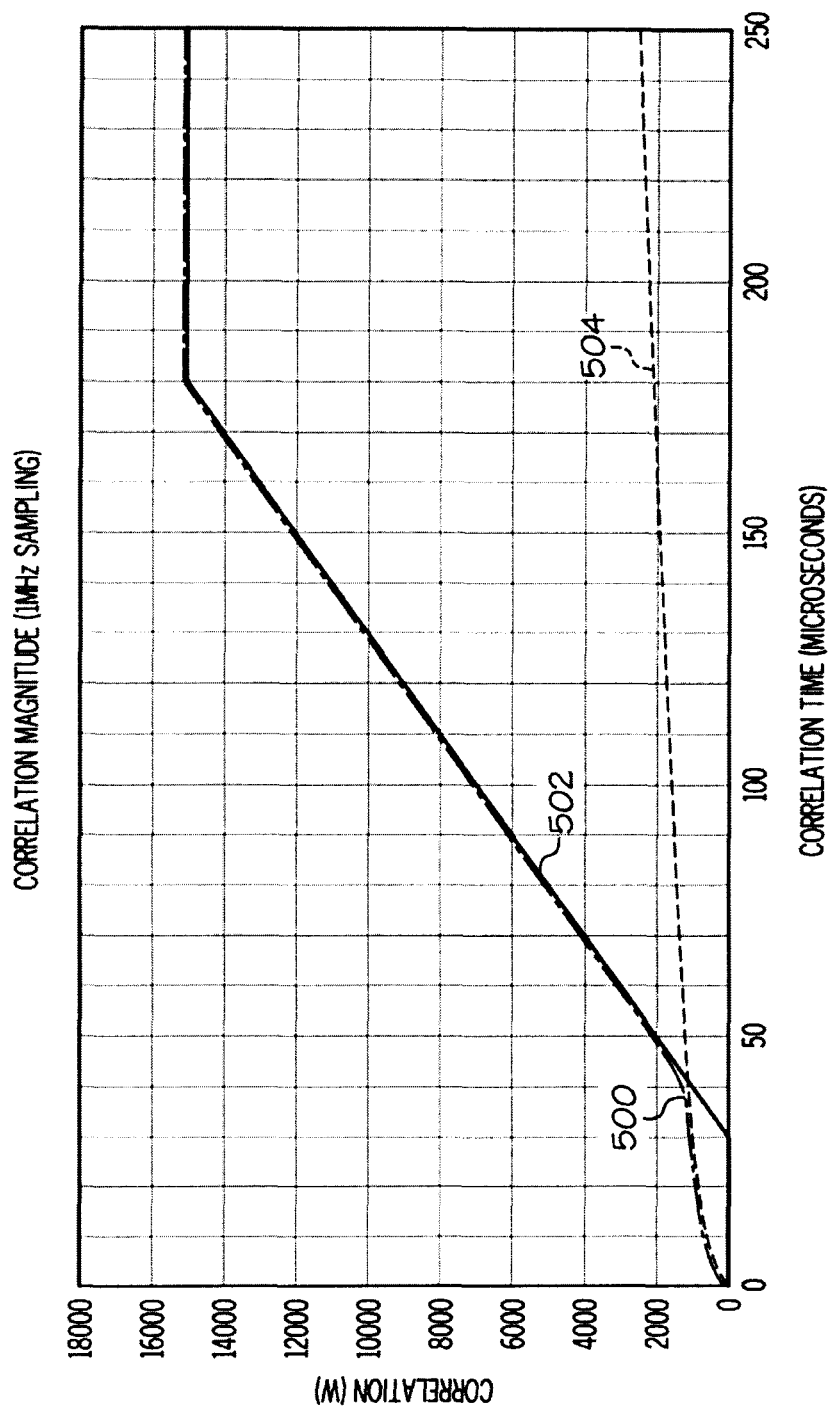
FIG. 5 is a graph depicting results of correlation process in FIG. 3 in accordance with an embodiment of the present disclosure.

FIG. 5 is a graph depicting results of the exemplary correlation process 300 in FIG. 3 in accordance with an embodiment of the present disclosure. The results of the correlation process depicted in FIG. 5 are with a sample rate of 1 Megahertz. The values plotted are the magnitudes of the correlation equation shown in FIG. 3 which is the same as Equation 1 above. The total correlation result 500 is illustrated by a long-dashed line in FIG. 5. The total correlation result will always be equal to or above the other two lines). That portion of the correlation result due to the signal is illustrated by a solid line 502 and that portion of the result due to noise is illustrated by a dashed line 504. In the example of FIG. 5, the correlation time is initiated some 30 microseconds before the signal arrives, and the correlator will integrate incoherent noise for that time. Incoherent noise will accumulate as the square root of the number of samples due to random phase, while the correlation result of a received signal will accumulate linearly with the number of samples. Once the weak signal is initiated, the signal contribution of the correlation result increases dramatically. This contribution (and the total correlation result) increases until the signal is terminated. If the correlation time continues beyond the signal duration, the benefit of the correlation process is eroded. Thus it is important to select a correlation time appropriate to the potential signals being examined.

The equation describing the relations shown in FIGS. 4 and 5 is shown in FIG. 6. FIG. 6 is an illustration of determining or calculating a correlation between an exemplary signal of interest and noise received by each antenna of a pair of antennas of an array. The total field (x) on each antenna is the sum of the signal (s) and the noise (n). Instantaneously, the signal and noise contributions of a single correlation product (of a single measurement from each antenna) will be proportional to the instantaneous signal to noise ratio. When the correlation result is summed across multiple samples, however, the signal portion will grow linearly. This is due to the phase of each pair of signal measurements being constant. Conversely, the noise contributions will have random phases, so their contributions will grow as the square root of the number of samples. Thus over time, the linearly growing contribution of the actual signal can exceed the slower-growing contribution of the noise as illustrated in FIGS. 4 and 5.

The total result of the correlation process is dependent on the correlation time used. If the signal being detected is of known length, a correlation length can be chosen that will maximize the detection probability. The quality of the phase estimate will be dependent on the correlation length and the alignment of any signal within a particular window. If the detailed properties of the signal are not known, a range of trial correlation lengths can be used. The correlation calculation can be executed in parallel if sufficient computing resources are available.

Figure 7:
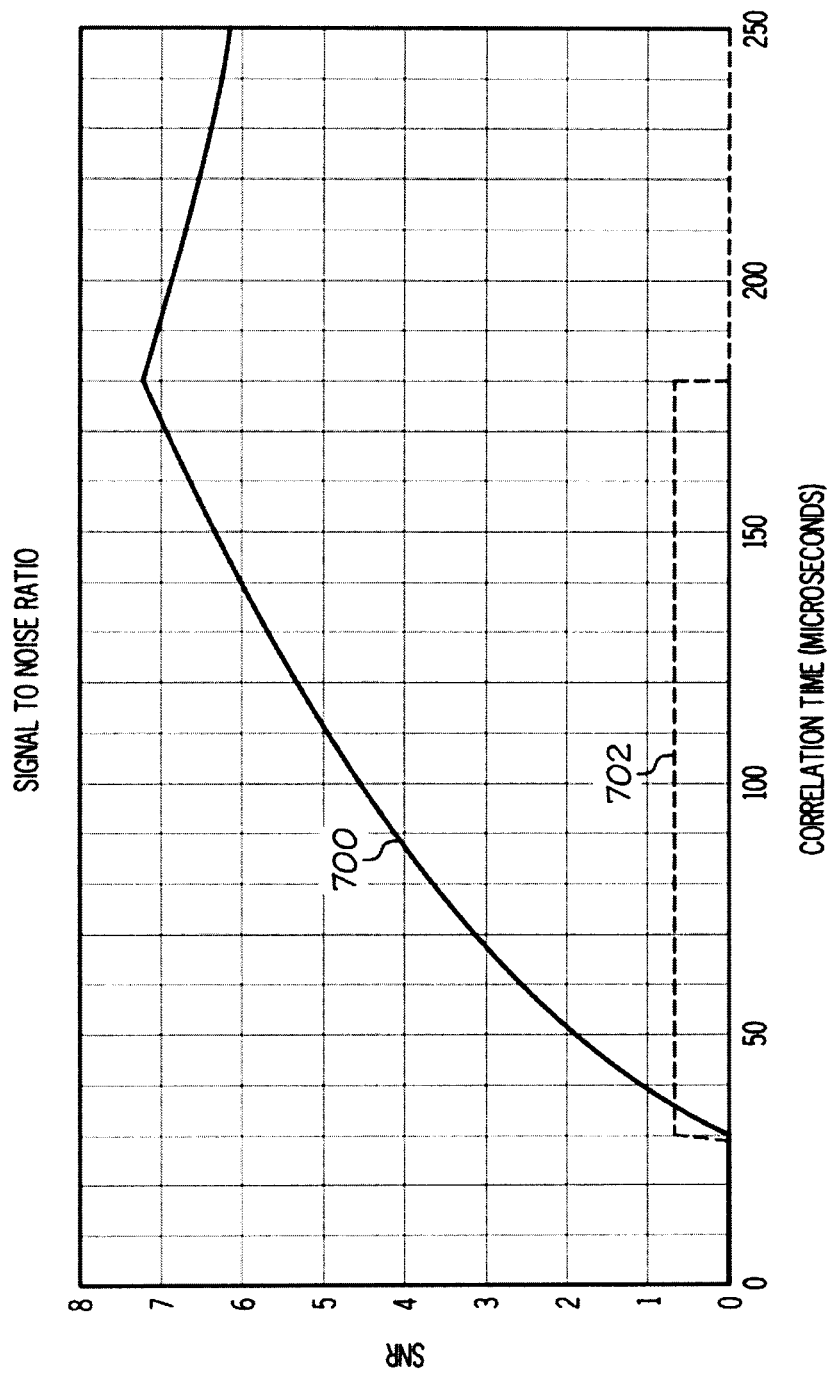
FIG. 7 is a graph depicting the signal-to-noise ratio resulting from the correlation process in FIG. 3.

FIG. 7 is a graph depicting the signal-to-noise ratio 700 resulting from the correlation process, such as the correlation process in FIG. 3. The instantaneous signal to noise ratio (SNR) 702 (in power) of the actual signal is shown. The instantaneous SNR 702 actually exceeds the correlator SNR 700 early during the signal presence. This is due to the noise that was integrated during the first 30 microseconds of the example in FIG. 4. The correlator SNR 700 quickly dominates, and peaks at the end of the signal duration, at about 5.5, illustrating that the process can be used to detect signals.

Figure 8:
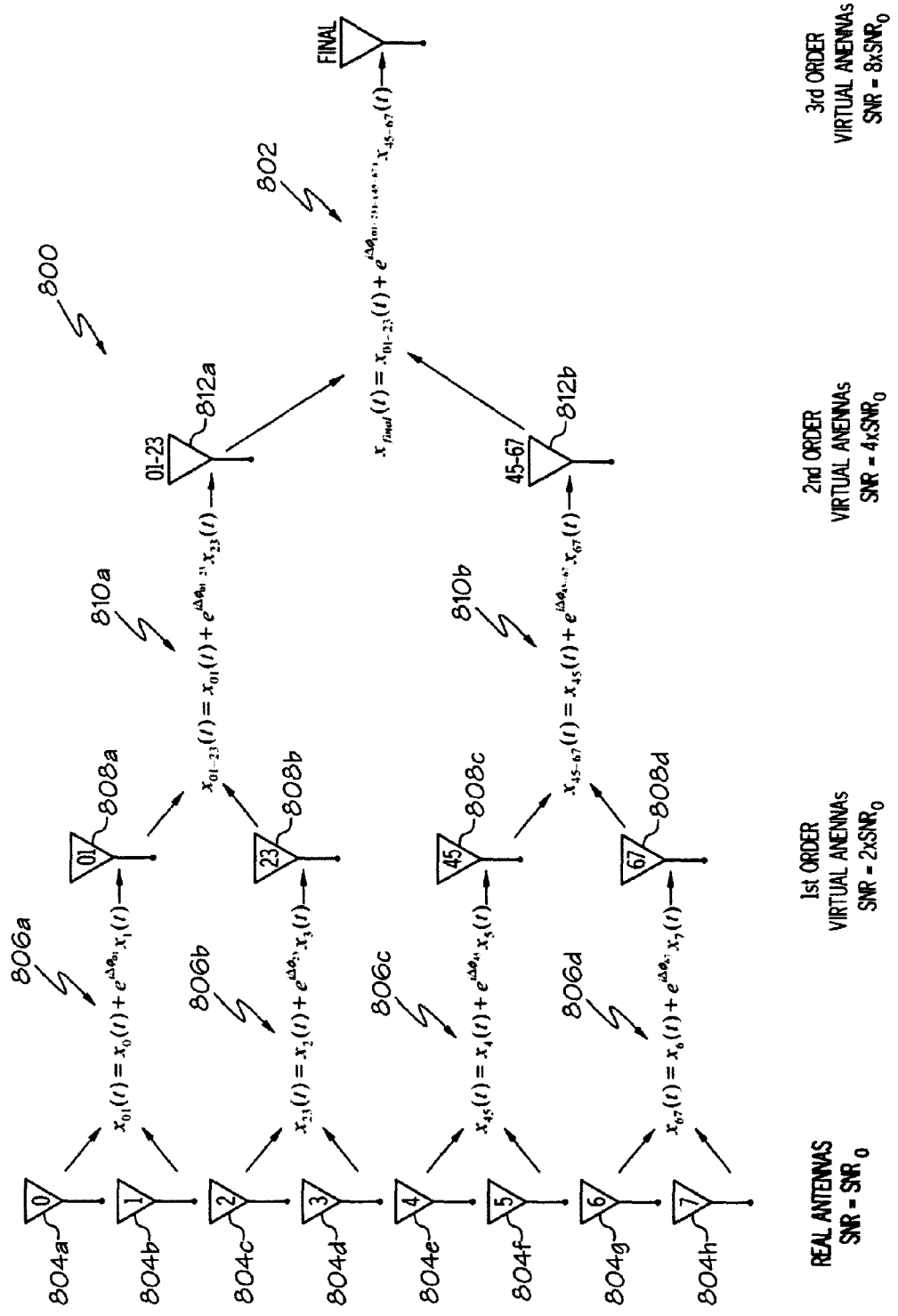
FIG. 8 is an illustration of an exemplary process or method for recursively summing antenna pairs to generate a maximum signal gain in accordance with an embodiment of the present disclosure.

FIG. 8 is an illustration of an exemplary process 800 or method for recursively summing antenna pairs to generate a maximum gain signal 802 in accordance with an embodiment of the present disclosure. The process 800 or method may be used to generate the maximum gain signal in block 120 of FIG. 1B. As illustrated in FIG. 8 digital samples of the signals from real antennas 804a-804h may be combined or summed in respective pairs to provide a combined signal 806a-806d from each pair of antennas 804a-804h. Each combined signal 806a-806d may be considered to be received by a virtual antenna 808a-808d. The in-phase combined signals from each respective pair of virtual antennas 808a-808d may be summed to provide a second set of combined signals 810a and 810b that may be considered to be respectively received by virtual antennas 812a and 812b. The in-phase signals from the pair of virtual antennas 812a and 812b may be combined or summed to provide the single resultant signal or the maximum gain signal 802. As illustrated in FIG. 8 with each set of virtual antennas, the signal-to-noise ratio increases by a factor of two. Accordingly, with a sufficient number of antennas the signal can be reconstructed using the array gain to achieve a signal strength that allows signal decoding or demodulation.

Figure 9B:
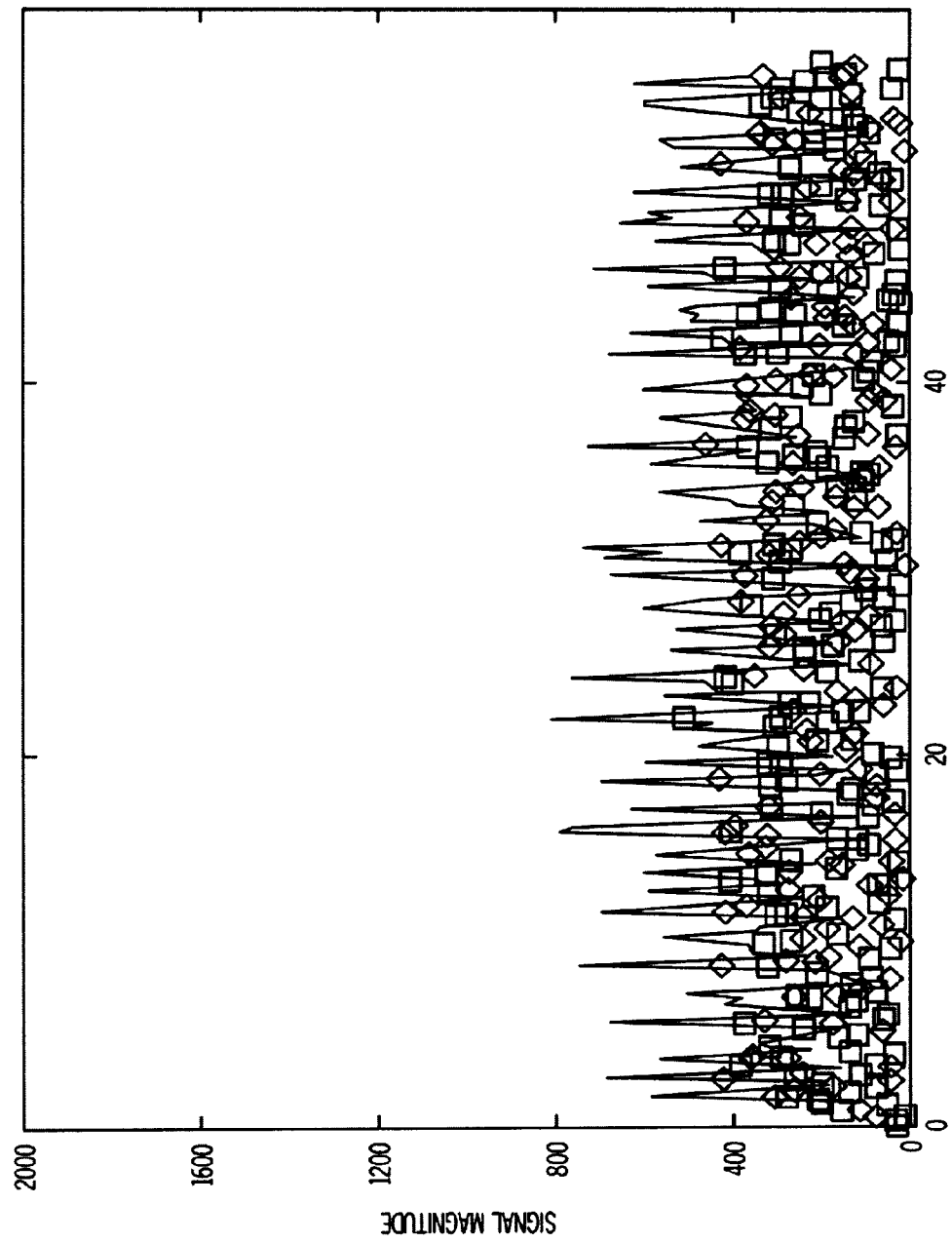

FIGS. 9A-9D are an example of the process or method of FIG. 8 applied to an actual set of data of 56-bit Automatic Dependent Surveillance-Broadcast (ADS-B) signals. The ADS-B signals may also be illustrative of the process applied by the system 200 in FIG. 2. The signals illustrated in FIGS. 9A-9D are obtained from four monopole antennas, such as antennas 804a-804d in FIG. 8 or antennas 202a-202d in FIG. 2. The four signals from each of the four antennas may be digitized and down-converted similar to that described with reference to FIG. 2. In FIG. 9A, the in-phase sum of the signals (solid line in FIG. 9A) from a first pair of antennas, such as antennas 804a and 804b in FIG. 8, may be compared with the amplitudes or magnitudes of the individual signals (symbols in FIG. 9A). As previously described, the in-phase sum of the signals is calculated by using the phase from the correlations to make the complex signals have approximately the same phase. Similarly, in FIG. 9B, the in-phase sum of the signals (solid line in FIG. 9B) from a second pair of antennas, such as antennas 804c and 804d in FIG. 8, may be compared with respective amplitudes of the two signals (symbols in FIG. 9B).

Figure 9C:
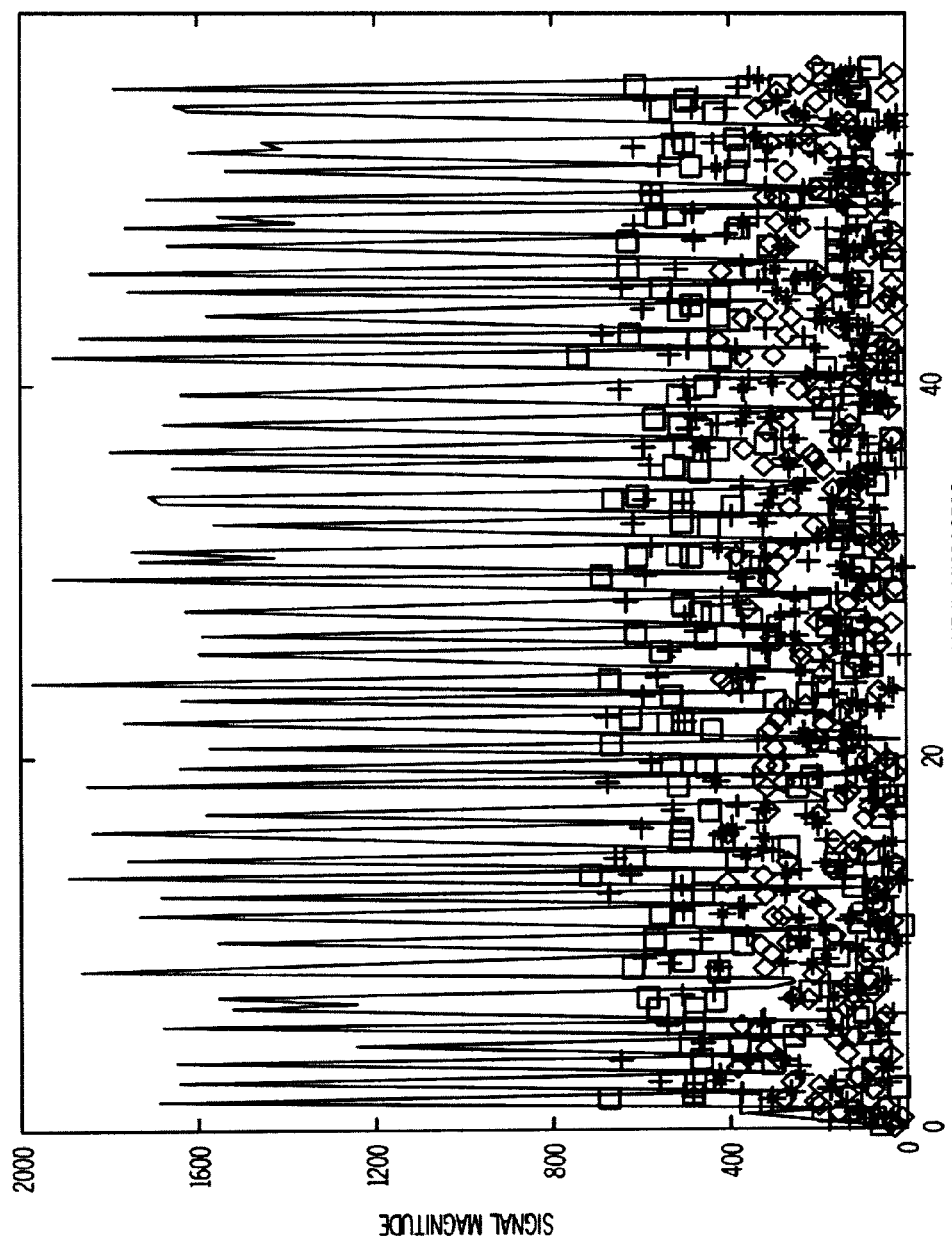
Figure 9D:
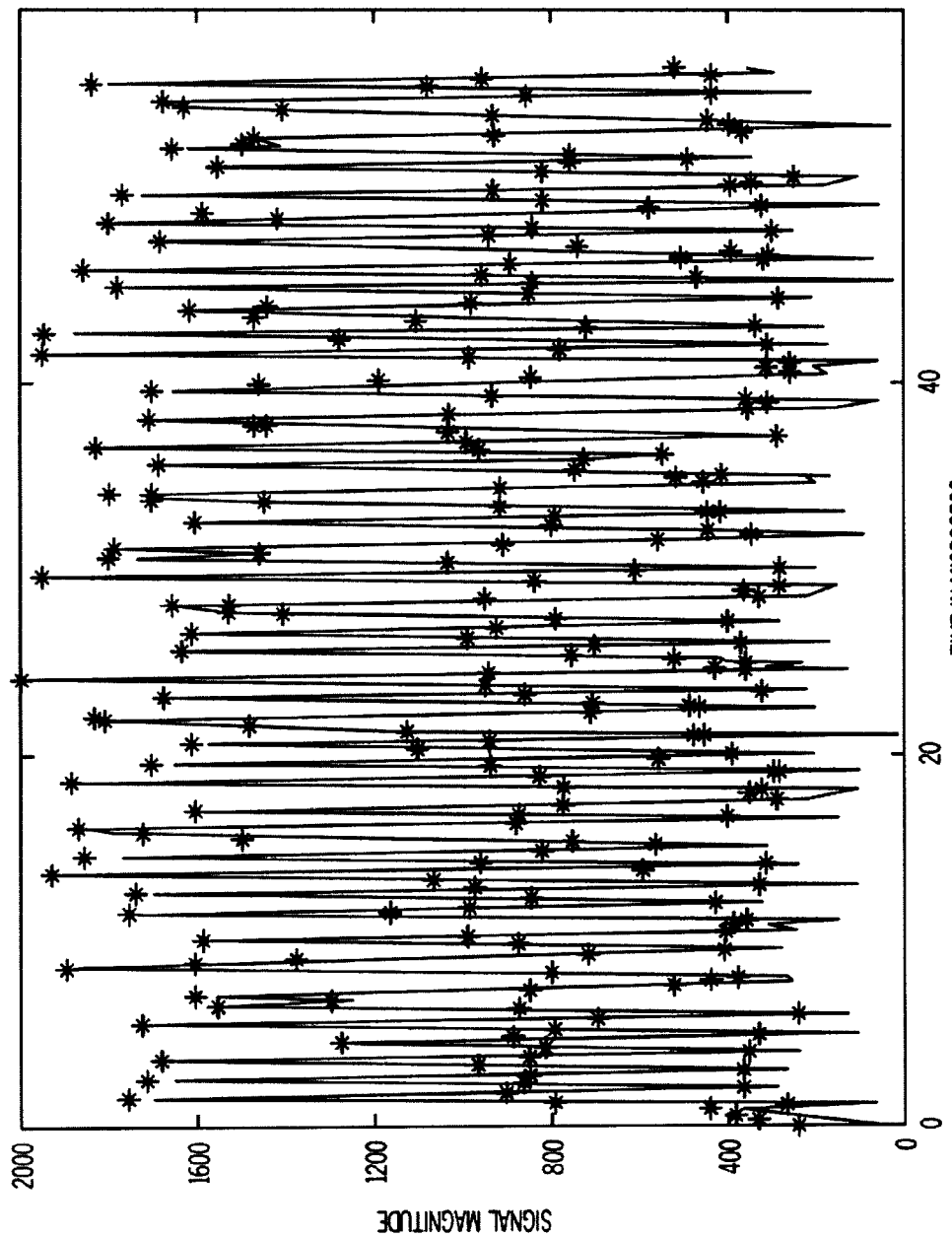

The result of adding signals in-phase pairwise from all four antennas as described with reference to FIG. 8 is shown in FIG. 9C. The signals from different antennas are represented by the different symbols on the lines in FIG. 9C. FIG. 9D is a comparison of the in-phase sum of the signals from the four antennas with the sum of the magnitudes from all four antennas (indicated by the * in FIG. 9D). Adding complex in-phase signals suppresses the noise which has substantial interference of the rapidly varying phase terms. In adding the magnitudes of the signals, the noise components are not suppressed by the phase interference. The peak magnitude of the magnitude summing approach (that portion associated with the signal) matches well with the phase summing approach, while the magnitude of the noise of the magnitude summing approach is substantially higher than the phase summing approach. Thus, the phase summing approach raises the overall signal to noise ratio of the received signal. Accordingly, the process yields a combined signal with an amplitude near the ideal maximum.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. A method for detecting and processing signals, comprising:
   receiving a weak radio frequency (RF) signal by an array of antennas;
   digitally sampling the weak RF signal from each antenna of the array of antennas;
   storing digital samples of the weak RF signal from each antenna;
   detecting a presence of the weak RF signal, wherein detecting the presence of the weak RF signal comprises determining a correlation between the weak RF signal received by each of the antennas of the array of antennas using the digital samples of the weak RF signal from each antenna, wherein determining the correlation between the weak RF signal received by each of the antennas of the array of antennas comprises:
      producing a phase difference between digital samples of signals of respective pairs of antennas of the array of antennas;
      combining the digital samples of signals for each respective pair of antennas using the phase difference between the combined digital samples of signals to provide a resulting signal from each pair of antennas, each resulting signal being receivable by a virtual antenna; and
      iteratively combining the resulting signals from respective pairs of virtual antennas using a phase difference between the combined resulting signals to provide a single resultant signal.

2. The method of claim 1, wherein detecting the presence of the weak RF signal comprises comparing a magnitude of the single resultant signal to a preset threshold value, the presence of the weak RF signal being detected in response to the magnitude of the single resultant signal exceeding the preset threshold value.

3. The method of claim 1, further comprising determining a phase difference of the weak RF signal received by each antenna of the array of antennas, wherein the phase difference of the weak RF signal received by each antenna is determined from the correlation between the weak RF signal received by each of the antennas of the array of antennas using the digital samples of the weak RF signal from each antenna.

4. The method of claim 3, further comprising:
   generating a maximum gain signal using the digital samples of the weak RF signal for each antenna and the phase difference of the weak RF signal received by each antenna of the array of antennas in response to detecting the presence of the weak RF signal; and
   demodulating the maximum gain signal to extract information from the received weak RF signal.

5. The method of claim 4, wherein generating the maximum gain signal comprises:
   summing in-phase digital samples of signals from respective pairs of antennas of the array of antennas to provide a combined signal from each pair of antennas, each combined signal being receivable by a virtual antenna;
   recursively summing in-phase combined signals from respective pairs of virtual antennas to provide a single resultant combined signal, the single resultant combined signal being the maximum gain signal.

6. The method of claim 1, further comprising providing a plurality of channelized correlators, one channelized correlator being associated with each respective pair of antennas of the array of antennas, wherein each channelized correlator executes a channelized algorithm on the digital samples of signals from the associated pair of antennas for detecting the weak RF signal and for producing the phase difference between the digital signal samples from the associated pair of antennas.

7. The method of claim 6, further comprising a plurality of channelized summers, one channelized summer being associated with each respective pair of antennas of the array of antennas and connected to an associated channelized correlator, wherein each channelized summer is configured for combining the digital samples of the signals from the associated respective pair of antennas using the phase difference from the associated channelized correlator to provide the resulting signal from associated respective pair of antennas.

8. A method for detecting and processing signals, comprising:
   receiving a weak radio frequency (RF) signal by an array of antennas;
   digitally sampling the weak RF signal from each antenna of the array of antennas;
   storing digital samples of the weak RF signal from each antenna;
   detecting a presence of the weak RF signal;
   determining a phase difference of the weak RF signal received by each antenna of the array of antennas, wherein detecting the presence of the weak RF signal and determining the phase difference of the weak RF signal received by each antenna comprises determining a correlation between the weak RF signal received by each of the antennas of the array of antennas using the digital samples of the weak RF signal from each antenna, wherein determining the correlation between the weak RF signal received by each of the antennas of the array of antennas comprises:
      producing a phase difference between digital samples of signals of respective pairs of antennas of the array of antennas;
      combining the digital samples of signals for each respective pair of antennas using the phase difference between the combined digital samples of signals to provide a resulting signal from each pair of antennas, each resulting signal being receivable by a virtual antenna; and iteratively combining the resulting signals from respective pairs of virtual antennas using a phase difference between the combined resulting signals to provide a single resultant signal; and generating a maximum gain signal using the digital samples of the weak RF signal for each antenna and the phase difference of the weak RF signal received by each antenna of the array of antennas in response to detecting the presence of the weak RF signal.

9. The method of claim 8, wherein detecting the presence of the weak RF signal comprises comparing a magnitude of the single resultant signal to a preset threshold value, the presence of the weak RF signal being detected in response to the magnitude of the single resultant signal exceeding the preset threshold value.

10. The method of claim 8, wherein determining a phase difference of the weak RF signal received by respective pairs of antennas corresponds to a phase of the resulting signal from each respective pair of antennas.

11. The method of claim 8, wherein generating the maximum gain signal comprises:

summing in-phase digital samples of signals from respective pairs of antennas of the array of antennas to provide a combined signal from each pair of antennas, each combined signal being receivable by a virtual antenna;

recursively summing in-phase combined signals from respective pairs of virtual antennas to provide a single resultant combined signal, the single resultant combined signal being the maximum gain signal.

12. The method of claim 8, further comprising demodulating the maximum gain signal to extract information from the received weak RF signal.

13. The method of claim 8, further comprising determining an angle of arrival of the weak RF signal based on the phase difference of the weak RF signal received by each antenna of the antenna array.

14. The method of claim 8, wherein the digital samples of the weak RF signal from each antenna comprises a bandwidth and a sample rate.

15. The method of claim 14, further comprising channelizing the stored digital samples into a set of channels, wherein each channel comprises a center frequency and a frequency width, wherein detecting a presence of the weak RF signal is performed for each channel.

16. The method of claim 15, further comprising determining an angle of arrival for each channel using the phase difference of the weak RF signal received by each antenna.

17. A system for detecting and processing signals, comprising:

an array of antennas for receiving a weak RF signal;

a component configured to digitally sample the weak RF signal from each antenna of the array of antennas;

a storage device for storing digital samples of the weak RF signal from each antenna;

a plurality of channelized correlators, one channelized correlator associated with each respective pair of antennas of the array of antennas, each channelized correlator being configured to determine a correlation between the weak RF signal received by the associated pair of antennas using the digital samples of the weak RF signal from each antenna;

a plurality of channelized summers, one channelized summer associated with each respective pair of antennas of the array of antennas for combining the digital samples of signals from the respective pair of antennas using a phase difference between the digital samples of signals being combined to generate a combined signal; and a comparator to compare a magnitude of a resultant signal from iteratively pair-wise combining the digital samples of signals from each of the antennas of the array of antennas to a preset threshold, wherein a presence of the weak RF signal is detected in response to the magnitude of the resultant signal exceeding the preset threshold.

18. The system of claim 17, wherein the channelized correlator associated with each respective pair of antennas is configured to determine the phase difference of the weak RF signal received by each antenna of the array of antennas, wherein the phase difference of the weak RF signal received by each antenna is determined from the correlation between the weak RF signal received by each of the antennas of the array of antennas using the digital samples of the weak RF signal from each antenna.

19. The system of claim 18, wherein the plurality of channelized summers are configured to generate a maximum gain signal using the digital samples of the weak RF signal for each antenna and the phase difference of the weak RF signal received by each antenna of the array of antennas in response to detecting the presence of the weak RF signal.

20. The system of claim 19, further comprising a demodulator for demodulating the maximum gain signal to extract information from the received weak RF signal.

* * * * *